Jan. 30, 1940.                V. J. BUTTERFIELD                2,188,388
                        AUTOMOBILE HEATER AND DEFROSTER
                              Filed May 5, 1937            2 Sheets-Sheet 1
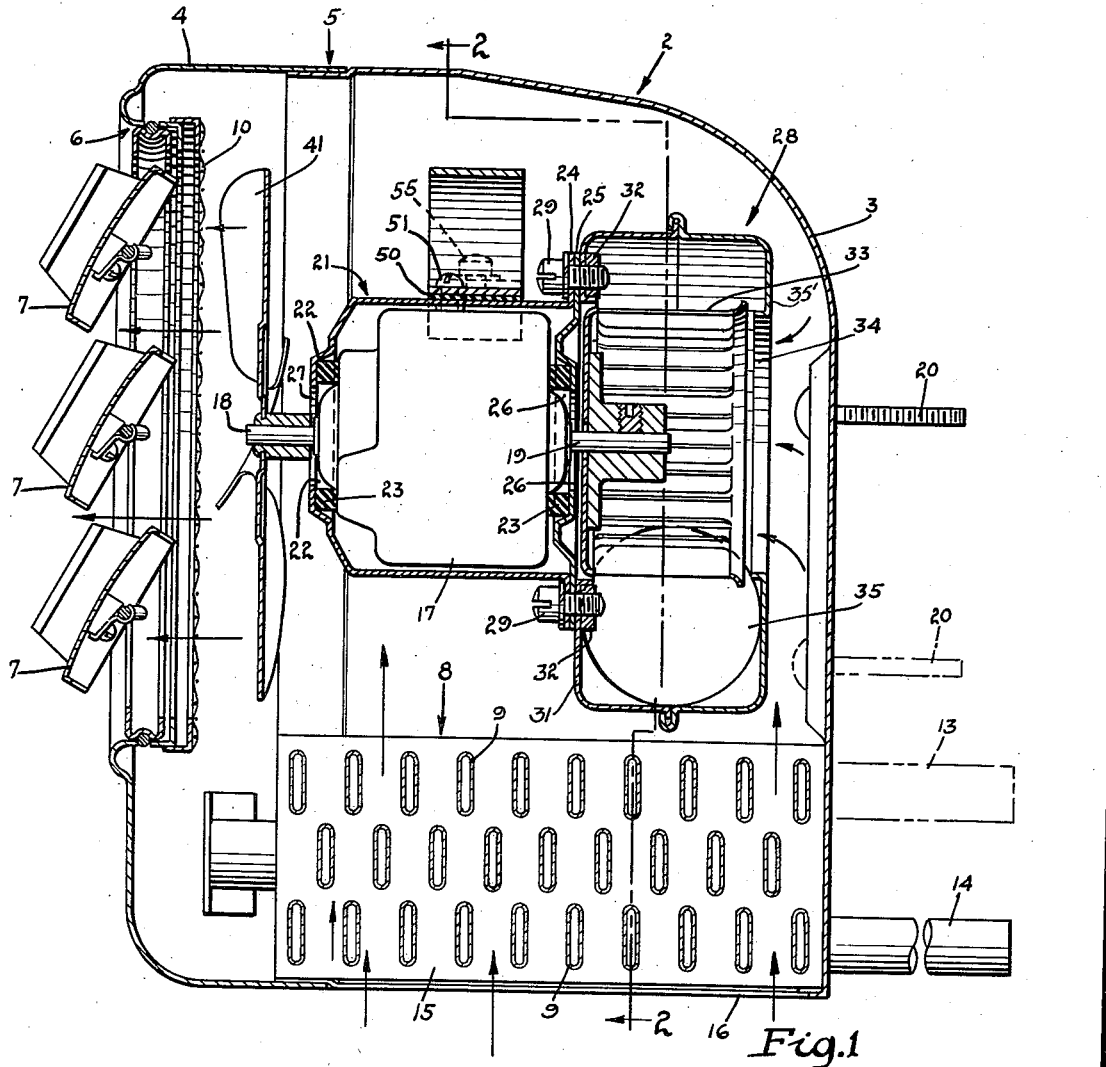
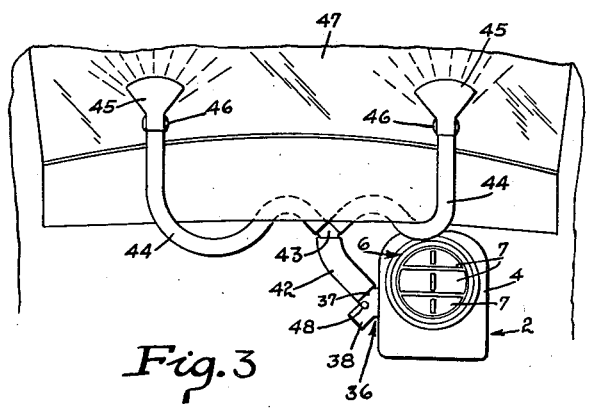
INVENTOR
VERNON J. BUTTERFIELD
BY
ATTORNEYS

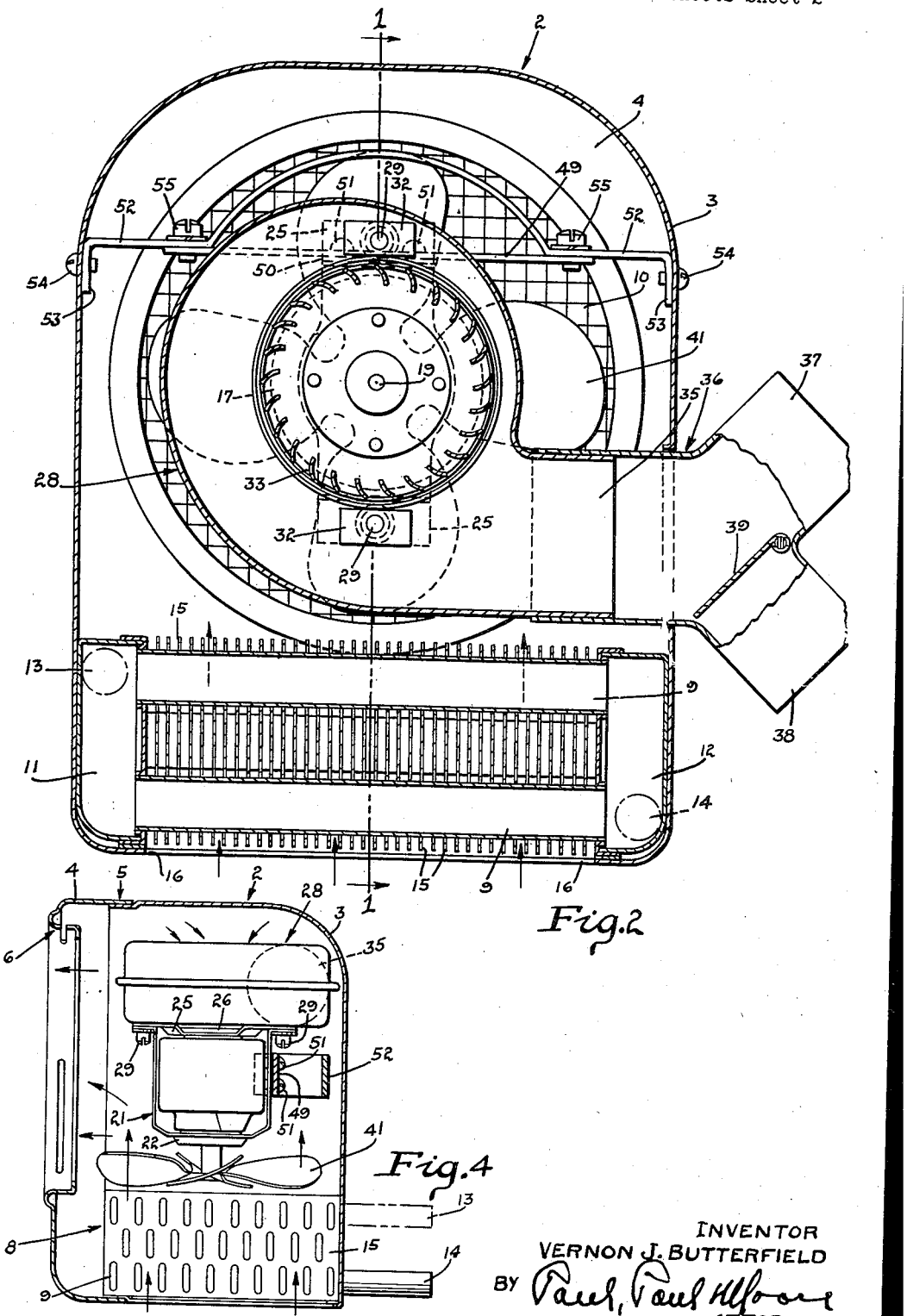

Patented Jan. 30, 1940

2,188,388

UNITED STATES PATENT OFFICE 2,188,388

AUTOMOBILE HEATER AND DEFROSTER

Vernon J. Butterfield, Minneapolis, Minn., assignor to Tropic-Aire, Incorporated, Minneapolis, Minn., a corporation of Delaware Application May 5, 1937, Serial No. 140,986

10 Claims. (Cl. 257—137)

This invention relates to new and useful improvements in automobile heaters and defrosters and an object of the invention is to provide an apparatus of this character in which the air circulating fan and defroster blower are so arranged with respect to the air heating core as to provide a very compact and highly efficient unit, which may be mounted in a comparatively small space.

A further object of the invention is to provide a combination heater and defroster comprising a suitable casing having an air discharge opening in its front wall and provided at its lower portion with a suitable air heating core, and means being mounted within the casing for drawing cold air up through said core and discharging it through the opening in the front wall of the casing.

A further object is to provide a combination heater and defroster comprising a casing having an air discharge opening in a wall thereof and provided with a suitable air heating core having means for connecting it to the water circulating system of the vehicle engine, and an air circulator being mounted within the casing comprising a single motor having a fan at one end for circulating heated air through said opening and into the vehicle body, and having at its opposite end, a suitable blower for circulating a portion of the heated air to the windshield for defrosting purposes.

A further object is to provide an apparatus of the class described, comprising a casing having an air heating core in its lower portion and a motor being mounted within said casing and operating a fan for drawing air into the casing through said core and circulating the heated air throughout the interior of the vehicle body, and a blower housing also being mounted within said casing and having its blower operatively connected to said motor, whereby when the motor is operated to circulate air through the casing a portion of the air drawn therein may be forced through a suitable conduit to a remote portion of the vehicle body, such as the windshield.

Other objects of the invention reside in the unique and compact construction of the apparatus, whereby it requires very little space for mounting; in the provision of such a structure wherein all moving parts are completely enclosed within a casing; in the unique arrangement of the core with relation to the air circulating means, and whereby the cold air drawn into the casing to be heated is taken from a point comparatively close to the floor of the vehicle, whereby more complete and thorough circulation of the heated air throughout the vehicle body is obtained; and, in the novel construction of the air circulating means which is assembled as a unit and may readily be removed from the casing as such, for repairs or other purposes.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a vertical sectional view on the line 1—1 of Figure 2, showing the general construction of the apparatus;

Figure 2 is a vertical sectional view on the line 2—2 of Figure 1, showing the means for diverting a portion of the warm air to the windshield;

Figure 3 is a fragmentary schematic view showing the combined heater and defroster installed in an automotive vehicle; and Figure 4 is a view showing a construction wherein the circulating unit is vertically mounted within the casing.

The novel apparatus herein disclosed is shown comprising a casing, generally indicated by the numeral 2, and including a front section or shell 4, having its open end fitting over the adjacent end of the casing 2, as shown at 5 in Figure 1. Suitable means, not shown, is provided for detachably securing the front shell 4 to the casing 2.

The front shell 4 has a suitable opening 6, through which the heated air is circulated from the interior of the casing. A plurality of air deflectors 7 are adjustably mounted within the opening 6 to control the directional flow of the heated air from the heater. These deflectors form no part of the present invention and it is therefore thought unnecessary to further illustrate or describe them. A suitable screen 10 is preferably provided back of the deflectors, as best shown in Figure 1.

A feature of the invention resides in the location of the air heating means which, as shown in Figures 1 and 2, comprises a suitable air heating core, generally indicated by the numeral 8. This core comprises a plurality of suitable water circulating tubes 9 communicating at their ends with chambers 11 and 12, having pipes 13 and 14, respectively, connected thereto and projecting through suitable openings in the rear wall of the casing, as indicated in Figure 1. The tubes 13 and 14 are adapted to be connected to the water cooling system of the vehicle engine in the usual manner, whereby a portion of the water from the cooling system is circulated through the core 8. The core, as is customary in devices of this kind, is provided with suitable fins 15 spaced apart, as shown in Figure 2, to provide air circulating passages through which the air is drawn into the casing, as illustrated by the arrows in Figures 1 and 2. The bottom wall of the casing is provided with a suitable opening 16, as clearly illustrated in Figures 1 and 2. Anchor bolts 20 project from the rear wall of the casing to provide means for mounting the apparatus on a suitable support, such as the dash of the vehicle.

Another important feature of the invention resides in the unique construction of the air circulating means, which, as best illustrated in Figure 1, comprises a single motor 17, having oppositely disposed shaft extensions 18 and 19. The motor is supported within a U-shaped bracket, generally indicated by the numeral 21, and having a cup-shaped recess 22 at one end for receiving a suitable resilient element 23, which preferably is of rubber, and is adapted to be clamped between the adjacent end wall of the motor and the bottom of the recess, as will be readily understood by reference to Figure 1. The spaced legs of the bracket 21 are shown provided with outwardly turned ears 24 seated against an end plate 25. This end plate has a recess 26 for receiving a similar resilient element 23. The bracket 21 and end plate 25 are so proportioned, that when the motor is inserted therebetween and the outwardly turned ears 24 of the bracket are clamped against the end plate 25, the motor will be firmly clamped between the resilient elements 23. Suitable openings 27 are provided in the bottoms of the recesses 22 and 26 to receive the shaft extensions 18 and 19.

A suitable blower housing, generally indicated by the numeral 28, is secured to the end plate 25 by suitable screws 29 which pass through alined apertures in the ears 24, end plate 25, and adjacent wall 31 of the blower housing 28, as clearly illustrated in Figure 1. Reinforcing elements or blocks 32 may be secured to the inner surface of the end wall 31 of the blower housing to receive the threaded terminals of the screws 29. It is to be understood that the reinforcing blocks are threaded and serve as nuts to receive the screws 29.

A suitable centrifugal blower 33 is mounted on the shaft extension 19 within the blower housing 28, and is adapted to draw a portion of the heated air in the casing into the housing through an opening 34 provided in the end wall 35' of the blower housing. The blower housing 28 is provided with a tangentially disposed discharge opening 35, as is customary in centrifugal blowers. The discharge opening 35 is preferably cylindrical in cross section, and adapted to receive a suitable fitting 36 shown provided with branches 37 and 38. A suitable valve 39 is provided within the fitting 36 for controlling the flow of air through the branches 37 and 38 from the discharge opening 35. If desired, the cylindrical wall of the discharge opening 35 of the blower housing, may be extended through the opening in the casing wall in which the fitting 36 is shown seated in Figure 2. When so extended the fitting 36 is attached to the blower discharge exteriorly of the blower housing.

A suitable fan 41 is secured to the shaft extension 18 adapted to draw cold air through the core 8, into the casing and to circulate the heated air through the opening 6 in the front shell 4 of the casing and throughout the interior of the vehicle body.

As illustrated in Figure 3, a suitable connection 42 has one end connected to the branch fitting 37 and its opposite end to a Y-fitting having conduits 44 connected thereto. Suitable outwardly flared nozzles 45 are provided at the upper ends of the conduits 44, and are provided with suitable means, such as suction cups 46, for supporting them in position adjacent to the surface of the windshield 47. If desired, other means may be provided for supporting the nozzles 45 in position adjacent to the windshield.

The downwardly directed branch 38 of the fitting 36 is adapted to direct a portion or all of the warm air discharging from the blower housing 28, in a downward direction towards the floor, depending upon the position of the valve 39. The valve 39 is provided with a suitable finger grip 48, whereby it may be conveniently operated to control the circulation of air from the blower housing 28.

Another feature of the invention resides in the unique manner of supporting the air circulating means including the motor 17, fan 41, and blower housing 28 within the casing 2, whereby the air circulating means may readily be removed from the casing, as a unit, when desired. The means provided for thus supporting the air circulating means within the casing is shown comprising a strap-like member or bar 49, the intermediate portion of which is secured to the upper portion of the bracket 21 by suitable screws 51. A piece of rubber or other suitable material 50 is interposed between the bracket 21 and member 49 to absorb vibration and to cushion the connection between these two parts. The terminals of the strap-like member 49 are detachably secured to an arched cross member 52 provided within the casing and having its terminals 53 suitably secured to the side walls thereof by such means as screws 54. Suitable screws 55 detachably secure the bar 49 to the cross member 52. When the screws 55 are removed, the air circulating means may be removed from the casing, as a unit.

To remove air circulating means, including the motor 17, fan 41, and blower 28, from the casing, the front shell 4 is preferably detached from the casing 2, whereby access may readily be had to the screws 55. Before the air circulating means can be removed from the casing, the branch fitting 36 is detached from the discharge opening 35 of the blower housing 28. When the front shell 4 and branch fitting 36 have been detached from the heater, and the screws 55 removed, the entire air circulating means may readily be removed from the casing as a unit, which is a very desirable feature in structures of this type. It is also to be noted that the air circulating unit may be removed from the casing without detaching the latter from the vehicle, as will be readily understood by reference to Figure 1.

In the form illustrated in Figure 4, the air circulating unit is shown vertically disposed within the casing, whereby the fan 41 is mounted in close proximity to the core 8 and draws the cold air upwardly therethrough into the casing whereby the air is heated. From the casing 2, the major portion of the heated air is discharged through the opening 6 into the vehicle body. A portion of the heated air in the casing is drawn into the lower housing 28 by the blower 33, and is directed to the windshield or some other remote portion of the vehicle body by means of the fitting 36 and conduits 44. The air circulating unit, shown in Figure 4, is mounted within the casing in substantially the same manner as the unit illustrated in Figures 1 and 2, except that it is vertically disposed, the same supporting bar 49 and cross member 52 being employed. In Figure 4, the deflectors 7, shown in Figure 1, have been omitted.

From the foregoing, it will be seen that by mounting the blower housing 28 within the casing 2 as herein disclosed, a very compact and simplified structure is made possible, which is inexpensive to manufacture, and highly efficient in operation. The fan 41 is also completely enclosed by the casing 2, whereby the casing presents a very neat and attractive appearance, and whereby all moving parts of the apparatus are concealed from view.

I claim as my invention:

1. A device of the class described comprising a casing having air inlet and outlet openings, a radiator in the casing opposed to the inlet opening and an air propeller unit within the casing secured thereto independently of the radiator, said unit comprising a bracket having a motor secured therein, an air propeller at one side of said motor bracket operated by the motor, and a housing attached to said bracket and having therein an air propeller also operated by the motor, said housing having an air intake through which heated air from the radiator enters and having an outlet extending through the wall of the casing, and means detachably securing the motor bracket to the casing.

2. A device of the class described comprising, a casing, having air inlet and outlet openings, a radiator in the casing, and an air propeller unit within the casing comprising a bracket having a motor secured therein, an air propeller at the outside of the bracket operated by the motor, a housing attached to the motor bracket and having an air propeller therein, and means attaching the unit to the casing including an arched element and means by which it is supportingly attached to the motor bracket.

3. A device of the class described comprising, a casing, having air inlet and outlet openings, a radiator in the casing and an air propeller unit within the casing comprising a bracket having a motor secured therein, an air propeller at the outside of the bracket operated by the motor, a housing attached to the motor bracket and having an air propeller therein, and means supporting the unit in the casing including a bridge element attached to the casing and motor bracket, and a cushion element interposed between the bridge element and the motor bracket.

4. In a heating unit, a casing having a radiator therein, a unit within the casing for forcing air across the radiator, said unit including a bracket having secured therein a motor which motor has a shaft passing through and projecting from the bracket at opposite sides, shock absorbing means interposed between the motor and the sides of the bracket adjacent respective points of traversal of the bracket by the shaft, air impellers respectively carried by opposite projecting ends of the motor shaft, and a single means suspending the unit from the casing and applied to the motor bracket at a point between the propelling means.

5. A device of the class described comprising a casing having therein a radiator, a bracket within the casing, and a motor secured therein, said motor having a shaft extending through opposite sides of said bracket, cushion means between the sides of the bracket and the motor, at points adjacent said shaft, a fan on one end of the shaft outside of the bracket, a blower on the opposite end of the shaft outside of the bracket, a blower housing for the blower having a delivery extension within the casing, a tubular fitting extending inwardly through an opening in the casing and having a telescopic engagement with the blower housing extension, and means suspendingly connecting the bracket within the casing.

6. In a device of the class described comprising a casing having therein a radiator, a bracket within the casing, a motor secured within the bracket by cushion rings fitting recesses of the bracket and engaging projections of the motor, the opposite ends of the motor shaft extending through sides of the bracket, a fan on one end of the shaft outside of the bracket, a blower on the opposite end of the shaft outside of the bracket, a blower housing for the blower attached to the bracket and having an outlet extending to the outside of the casing, and means connecting the bracket with the main casing.

7. In a device of the class described comprising a casing having therein a radiator, a motor within the casing, having a shaft, a bracket supporting the motor, a fan on one end of the shaft, a blower on the opposite end of the shaft, a blower housing for the blower having a delivery extension to the outside of the main casing, and means detachably connecting the motor to the casing including a first bar attached to the bracket and second bar secured thereto and having an arched portion overlying the first bar, the terminals of the second bar being secured to the walls of the main casing.

8. An air conditioning device comprising, a casing having air inlet and outlet openings, said casing being composed of two separable sections, a radiator within the casing for conditioning air as it enters, an air propelling unit within the casing adapted to be freely introduced thereinto or removed therefrom after one of the casing sections has been separated from the other, said unit comprising a motor having a shaft, a propeller type fan on the shaft at one side of the motor for expelling air through the outlet opening, an impeller on the shaft at the opposite side of the motor, an impeller housing surrounding the impeller and having an intake opening and further having a centrifugal air delivery extension, means securing the impeller housing to the motor, and suspending means for the unit secured to the last mentioned means and detachably secured to the casing, and means on the casing receiving the housing extension and adapting said extension to deliver air through the casing to a point outside thereof, said suspending means and said means receiving the housing extension constituting the sole supporting and steadying means for the unit whereby the unit with its suspending means can be bodily and easily introduced into the casing to be detachably secured.

9. An air conditioning device comprising, a casing having air inlet and outlet openings, said casing being composed of two separable sections, a radiator within the casing for conditioning air as it enters, an air propelling unit within the casing adapted to be freely introduced thereinto or removed therefrom after one of the casing sections has been separated from the other, said unit comprising a motor having a shaft, a propeller type fan on the shaft at one side of the motor for expelling air through the outlet opening, an impeller on the shaft at the opposite side of the motor, an impeller housing surrounding the impeller and having an intake opening and further having a centrifugal air delivery extension, a bracket securing the impeller housing to the motor, unit-suspending means secured to the bracket, means detachably securing said suspending means to the casing, and means on the casing receiving the housing extension and adapting said extension to deliver air through the casing to a point outside thereof, the last three mentioned means constituting the sole supporting means for the unit, whereby the unit with its suspending means can be bodily and freely introduced into the casing to be detachably secured.

10. An air conditioning device comprising, a casing having air inlet and outlet openings, said casing being composed of two separable sections, a radiator within the casing for conditioning air as it enters, an air propelling unit within the casing adapted to be freely introduced thereinto or removed therefrom after one of the casing sections has been separated from the other, said unit comprising a motor having a shaft, a propeller type fan on the shaft at one side of the motor for expelling air through the outlet opening, an impeller on the shaft at the opposite side of the motor, an impeller housing surrounding the impeller and having an intake opening and further having a centrifugal air delivery extension, a bracket securing the impeller housing to the motor, an elongated unit-suspending element secured to the bracket and having ends abutting opposite walls of the casing, screws traversing said walls and securing respective ends of said suspending element, and means on the casing receiving the housing extension and adapting said extension to deliver air through the casing to a point outside thereof, said unit-suspending element, said screws and said means receiving the housing extension constituting the sole supporting and steadying means for the unit, whereby the unit with its suspending means can be bodily and easily introduced into the casing to be quickly detachably secured.

VERNON J. BUTTERFIELD.